Jan. 5, 1960 K. J. TOBIN 2,919,662
CARGO LOADING AND STORAGE APPARATUS
Original Filed June 17, 1952 4 Sheets-Sheet 1
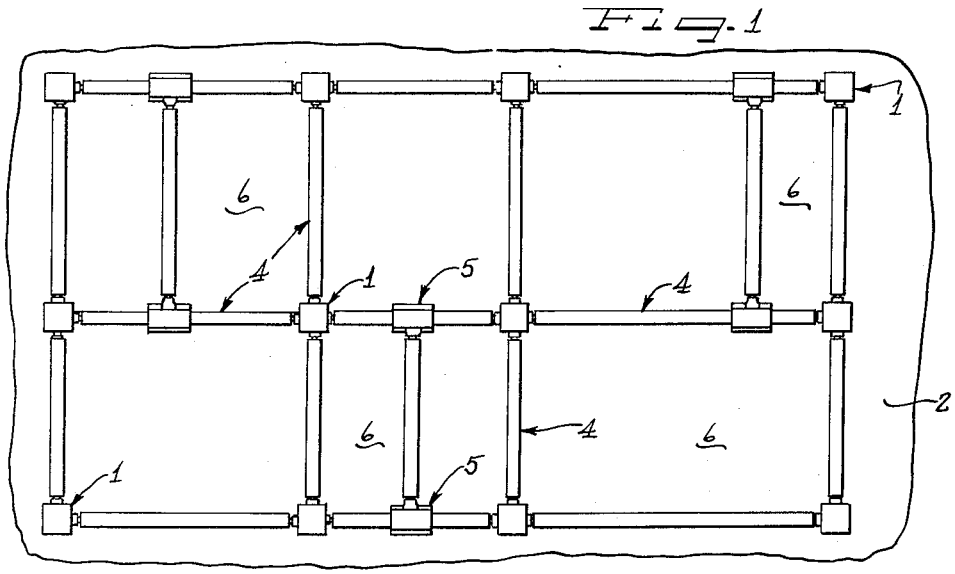
Fig. 1
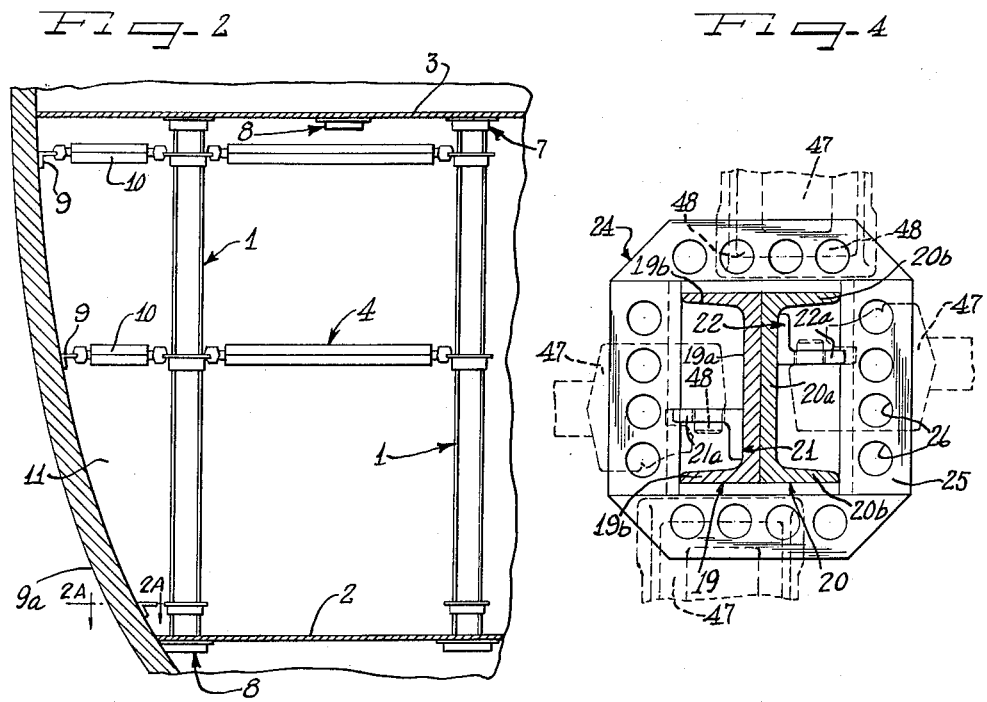
Fig. 2
Fig. 4
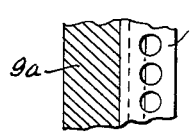
Fig. 2A
Inventor
Kenneth J. Tobin

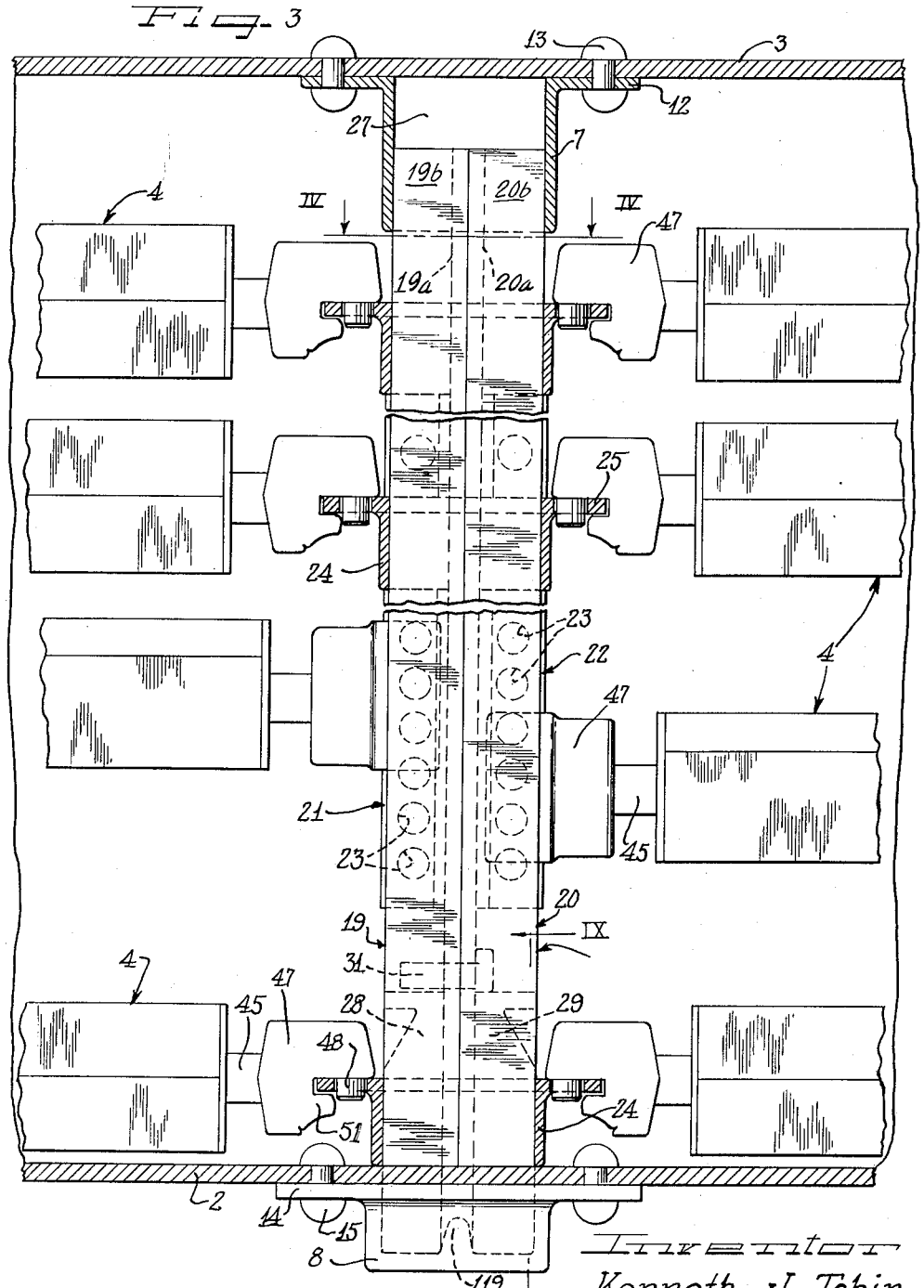

Jan. 5, 1960　　　　　K. J. TOBIN　　　　2,919,662
CARGO LOADING AND STORAGE APPARATUS
Original Filed June 17, 1952　　　　　　4 Sheets-Sheet 3
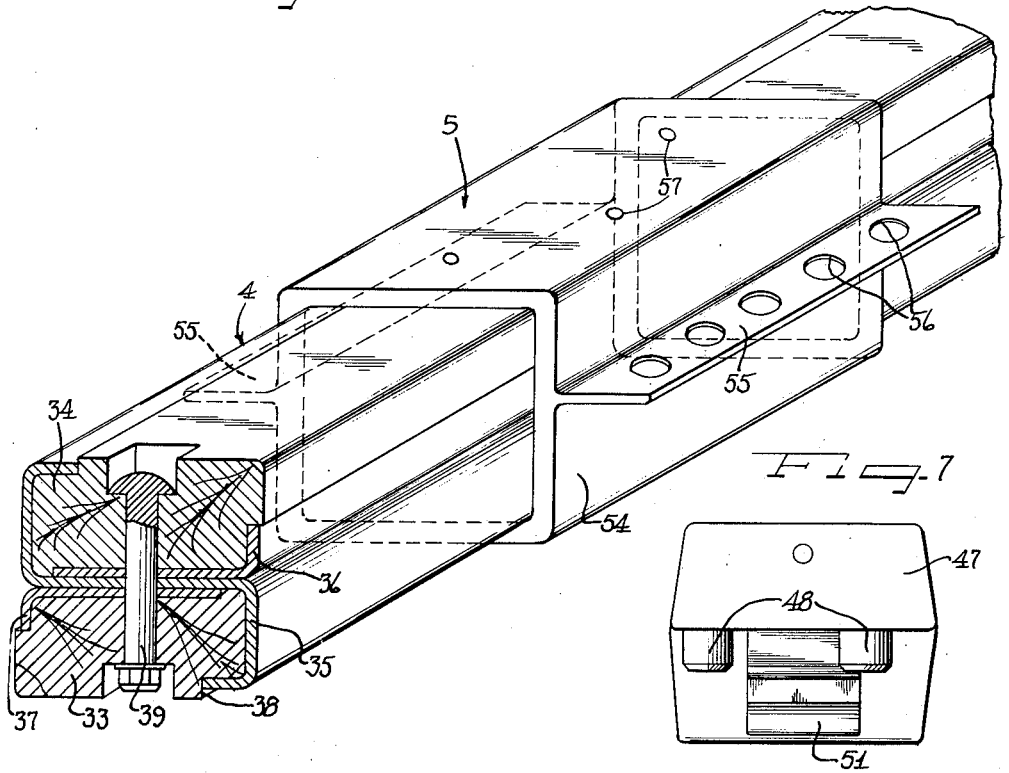
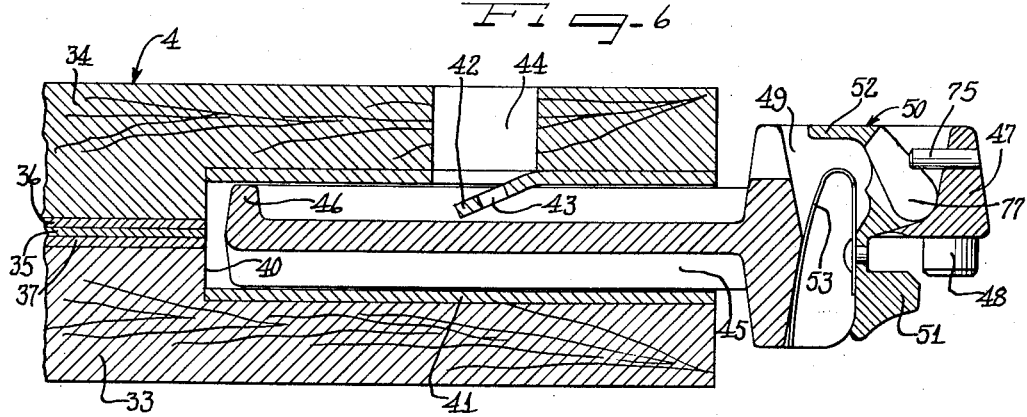
Inventor
Kenneth J. Tobin

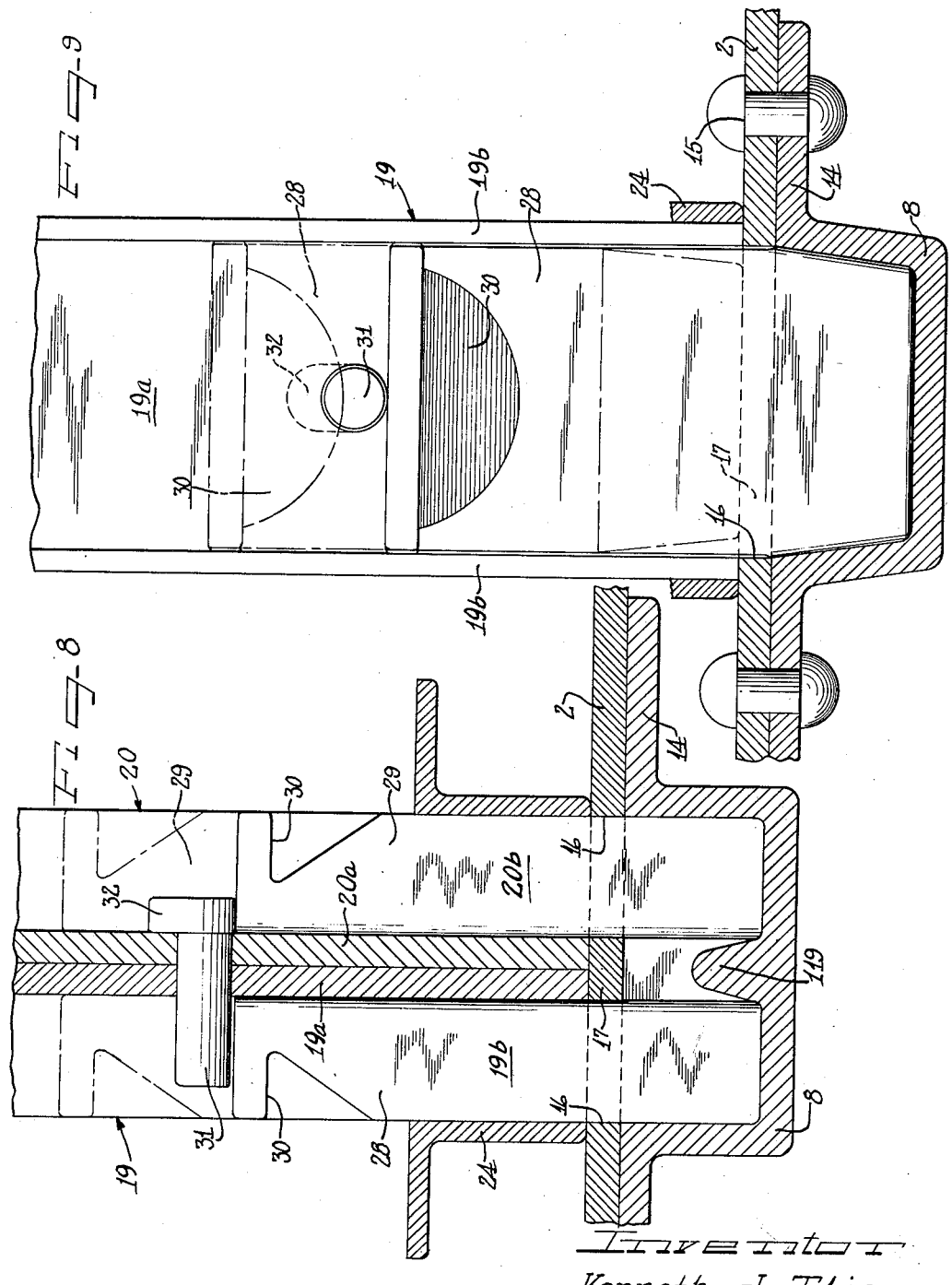

United States Patent Office 2,919,662
Patented Jan. 5, 1960

2,919,662

CARGO LOADING AND STORAGE APPARATUS

Kenneth J. Tobin, Sarasota, Fla., assignor to Evans Products Company, Plymouth, Mich., a corporation of Delaware Continuation of application Serial No. 294,037, June 17, 1952. This application December 28, 1956, Serial No. 631,362

17 Claims. (Cl. 105—369)

This invention relates to improvements in cargo loading and storage apparatus, and more particularly to apparatus highly desirable for use in connection with the loading of cargo on shipboard in such a manner that the cargo is held against shifting notwithstanding listing or rocking of the ship even in heavy seas, although the invention may be utilized for cargo loading in other locations, as will be apparent to one skilled in the art. This application is a continuation of my copending application Serial No. 294,037, filed June 17, 1952, now abandoned.

The invention is, of course, directed to that form of cargo loading apparatus employing reusable cargo holding members, which are not damaged or destroyed upon removal, but may be reused over and over again.

In the past, many and various types of cargo loading apparatus have been developed, and while much of this apparatus was satisfactory for use inside a freight car, truck trailer body, or similar location of particularly defined size and having right angle ends and sides, such formerly known apparatus was not of sufficient flexibility to be completely satisfactory for use in the hold of a ship for example where the walls are not perpendicular to the floor, where the floors must be substantially impediment free, and where the walls vary considerably in size and shape between different decks. One predominant reason for the lack of flexibility in apparatus of this character heretofore developed was the fact that a material portion of the apparatus had to be permanently mounted, namely the supporting means for the cross members or stretchers, and the further fact that cross members could not be connected to cross members and right angular relationship and wherever desired. In addition, with heretofore known apparatus, flush or smooth surfaces were not possible when the cross members were not in use.

With the foregoing in mind, it is an important object of the instant invention to provide cargo loading apparatus comprising both portable columns and cross members, and which apparatus is extremely flexible so that lading areas of substantially any size may readily be provided.

Also an object of this invention is the provision of a cargo loading apparatus highly desirable for use on shipboard and which is extremely flexible so that lading areas of substantially any desired size may be produced, and any character of lading positively held, while at the same time the water tight integrity of the ship is not damaged in the least.

It is also an object of this invention to provide a cargo loading apparatus highly desirable for cargo ships in general, especially desirable for ammunition cargos, and in which both uprights and cross members are portable and removable.

A further feature of the invention resides in the provision of cargo loading apparatus utilizing portable columns or uprights equipped with means for the securement of cross members, the cross members being adjustable upwardly, downwardly, and sidewise, relatively to the columns.

Still a further feature of the invention resides in the provision of cargo lading apparatus including adjustable cross members, means upon which to anchor the cross members, and means whereby cross members may be connected to cross members at any desired location.

Another desideratum of the instant invention resides in the provision of cargo loading apparatus in which the constituent elements may be made in substantially standard sizes, and which may be so connected together as to fit properly hold lading in variously sized ship holds, and regardless of the contour of the sides of a vessel.

It is also an object of the invention to provide cargo loading apparatus highly desirable for use on shipboard, and which is so arranged that the hold of a ship may readily and easily be squared off by elements of the apparatus to define cubical spaces for the lading, and the irregularly shaped cavities resulting from the squaring off of a ship hold may be utilized to store the loading apparatus when the same is not in use.

It is a further object of the invention to provide cargo loading apparatus highly desirable for use on shipboard, and wherein substantially all of the apparatus is portable and removable, so that when the apparatus is not in use, the decks are maintained clear with flush or smooth top surfaces.

Still another object of the invention resides in the provision of cargo loading apparatus embodying both columns or uprights and cross members, and wherein the columns are equipped with anchoring means for the cross members so disposed that the cross members may be anchored to the columns rightside up, upside down, or sidewise from either direction and in many different adjustment locations.

It is still a further object of the invention to provide cargo loading apparatus embodying portable columns equipped with anchoring flanges disposed both parallel to the axis of a column and at right angles thereto, to which cross members may be secured in selected positions of adjustment on each flange.

While some of the more salient features, characteristics and advantages of the instant invention have been above pointed out, others will become apparent from the following disclosures, taken in conjunction with the accompanying drawings, in which:

Figure 1 is a fragmentary diagrammatic plan view illustrating generally an arrangement of cargo loading apparatus embodying principles of the instant invention;

Figure 2 is a fragmentary vertical sectional view, taken transversely of the hold of a ship, and illustrating diagrammatically how the loading apparatus of Fig. 1 may be utilized in squaring the ship hold;

Figure 2A is a broken sectional view of the structure illustrated in Figure 2 taken along the line 2A—2A thereof;

Figure 3 is a fragmentary vertical sectional view with a portable column shown in elevation between upper and lower decks of a ship, and illustrating the connection of cross members to that column at selected points;

Figure 4 is a fragmentary plan sectional view taken substantially as indicated by the line IV—IV of Fig. 3, looking in the direction of the arrows, illustrating various connections of cross members in dotted lines;

Figure 5 is a fragmentary projectional view, with the end portion in section, illustrating connecting means for the attachment of one cross member to another at a selected point;

Figure 6 is an enlarged fragmentary vertical sectional view through the end portion of a cross member;

Figure 7 is an end elevational view of the attachment means of a cross member, taken from the right hand side of Fig. 6;

Figure 8 is a fragmentary vertical sectional view, with parts shown in elevation, taken in the lower central portion of Fig. 3 taken at right angles to Figure 9; and Figure 9 is a fragmentary vertical sectional view, with parts in elevation, taken substantially as indicated by the arrows IX—IX of Figure 3.

For purposes of clarity, the illustrated embodiment of the instant invention is shown associated with a ship, for the purpose of maintaining lading in fixed position in the hold of a ship during a voyage, although, as stated above, it will be understood that the present invention may be utilized for loading or storing cargo in other locations as well.

With reference now to Fig. 1, which is a diagrammatic showing, it will be seen that the instant invention includes a number of columns or uprights generally indicated by numeral 1 and which are disposed at substantially any desirable location consistent with the particular form or class of lading. With reference to Fig. 2, it will be seen that these columns extend upright between a lower deck 2 and an upper deck 3. The columns are portable and may be shifted from one location to another whenever desired.

Between the columns 1 cross members, generally indicated by numeral 4, and of varying lengths, may be disposed wherever needed in order to establish the proper square or rectangular areas for retaining the particular cargo in position. These cross members are connected to the columns at various points therealong, and are used in varying numbers consistent with the bulk and weight of the cargo. In certain circumstances it may be desirable to connect cross members to cross members, and in this instance provision is made by way of adapters, generally indicated by numeral 5, to readily accomplish this purpose with a maximum degree of selectivity. It will thereupon be seen that substantially any desired size and shape of cargo space may readily be provided, such as the spaces indicated by numeral 6. While not illustrated, it will be readily apparent that suitable aisles throughout the hold of a ship wherever desired or needed to facilitate loading, unloading, or inspection of the cargo, may be made.

All of the columns 1 and cross members 4 are portable, and may be taken down and stowed when not in use. The columns are held in position by sockets or keepers generally indicated by numeral 7 secured to the underside of the upper deck 3 is judicious locations, and by other sockets or keepers generally indicated by numeral 8 secured to the underside of the lower deck 2, the lower deck being apertured to permit the insertion of locking elements. The sockets 7 and 8 are permanently secured to the decks.

In Fig. 2 I have illustrated how the hold of a ship may be squared in order to properly load the cargo. To this end, angle irons 9 are secured to the hull plates 9a of the ship, as by welding, and extend along the hull. The projecting flange of these angles plates is provided with numerous apertures, while the attached flange is solid. With the exception of the necessary curvature of the attaching flange, these angle irons are exactly the same as those to be later described and mounted on the columns. A column 1 may be mounted vertically as close to the hull plates as is expeditious, and between that column and the angles 9, cross members 10 may be disposed. These cross members 10 not only aid in rigidifying the entire fabricated structure, but also may function as cross beams upon which other cross members and other columns may be disposed when not in use. Thus, it will be seen that in the space 11 adjacent the hull of a ship, and which space is unsuitable for cargo, all of the loading apparatus may be effectively stowed, with the single exception of that portion utilized to square the hold. The only portions of the loading apparatus that are permanently mounted, are the sockets 7 and 8, and the angles 9.

With reference to Fig. 3, it will be seen that the upper socket or keeper 7 is merely a tubular sleeve, one piece or fabricated, having a laterally extending flange 12 at the upper end which is secured to the underside of the upper deck 3 by welding, if permitted, and if not permitted, by rivets 13 as illustrated. No openings are made in the deck, except for the accommodation of rivets if they are used.

Now with reference more particularly to Figs. 8 and 9, it will be seen that the lower socket or keeper 8 is cup-like in shape, and disposed below the lower deck 2. This socket is provided with a laterally extending flange 14, secured to the underside of the lower deck 2 by welding if permitted, or by rivets 15 as illustrated. In order to afford communication with the socket 8, a pair of apertures 16—16, rectangular in shape in the illustrated instance, are cut through the deck 2, and between these apertures is a solid deck portion 17. Beneath this deck portion 17, the socket 8 is provided with an upstanding spacer rib 119 to aid in properly positioning locking plugs, as will more fully later appear.

Referring to Figs. 3 and 4, it will be noted that a column 1 is preferably made up of a pair of channel irons 19 and 20 disposed back to back and welded together to form in effect an integral I beam. While an I beam might be utilized for this purpose, it is preferable to weld a pair of channel members together to obtain the added thickness provided by the two webs 19a and 20a and to facilitate the welding thereto of angle irons 21 and 22 on opposite sides of the web, these angle irons parallelling the axis of the column. The outstanding flanges 21a and 22a (see Figure 4) of the angle irons 21 and 22 are each provided with a series of relatively closely spaced apertures 23 therealong. Several sets of the angle irons 21—22 may be provided on a column, the sets being separated vertically by collars 24 having outstanding flanges 25 thereon provided with rows of apertures 26 like the apertures 23 in the angle irons.

These collars 24 are preferably fabricated of what is commonly termed standard navy belt rail angles, coped or beveled at the corners as clearly seen in Fig. 4, on opposite sides, and which collars are welded or equivalently secured to the flanges 19b and 20b of the channels 19 and 20 forming the I beam core of the column. The collars are disposed at desired points along the columns, but as seen in Fig. 3, it is desirable to have one collar substantially at the base of each column. The collars 24, as well as the angle irons 21 and 22, provide means for connecting the cross members 4 to the columns at selective locations.

It is apparent from the showing in Fig. 3 that each column 1 is of less length than the distance between the lower deck 2 and upper deck 3, but is of sufficient length to extend partially within the upper keeper or socket 7, leaving a space 27 above the column. In mounting a column, it is a simple expedient to insert the upper end of a column inside the upper socket 7, push the column upwardly into the space 27 sufficient to permit straightening of the column, and then seat the column on the lower deck 2, as seen clearly in Fig. 8. It will be noted that the web portion of the column rests on the deck portion 17 between the apertures 16, while the flanges 19b and 20b of each of the channels 19 and 20 engage the deck portion outside of the apertures as seen in Fig. 9, and the lower collar 24 also seats upon the deck, aiding in stabilizing the column. To maintain the column against lateral shifting at the lower end, a pair of identical plugs 28 and 29 are dropped through the apertures 16 in the deck, into the socket 8, one on each side of the spacer rib 119. Each plug seats between the flanges of the respective channel, and each plug is provided at the top thereof with an undercut 30 to provide a hand hold. Looking at Fig. 3 again, it will be seen that the lower angle irons 21—22 terminate sufficiently above the lower collar 24 to permit placement and removal of the locking plugs 28 and 29. Now again with reference to Fig. 8, each locking plug is elevated to the dotted line position for insertion in the respective channel, and to clear the deck 2, and then dropped through the deck opening into the socket 8. After the plugs have been positioned, a locking pin 31 having an enlarged head 32 is inserted through suitable apertures in the web of the column just above the locking plugs, to maintain them in position. This operation of mounting a column, inserting the plugs, and locking them in position may be done very expediously, in far less time than it takes to describe.

In Figs. 5, 6 and 7 I have illustrated the general construction of a cross member 4, and in Fig. 5 have shown an adapter 5 making it possible to connect one cross member to another. Cross members 4 may be fabricated in numerous manners, it being desired to provide a cross member that is durable, and at the same time sufficiently light for one man to readily handle. With this thought in mind, I have illustrated by way of example a cross member comprising a pair of superposed timbers 33 and 34 bound together with the aid of a sheet metal member 35 of S-shaped cross-section and a pair of sheet metal angle members 36 and 37. These members provide a triple thickness web portion centrally of the cross member. It will be noted from the showing in Fig. 5 that wherever a sheet metal portion embraces a part of a wooden element or timber, the timber is cut inwardly or grooved as indicated at 38, so that regardless of the disposition of the cross member, a wooden portion thereof always projects outwardly beyond the metal, to contact the cargo or lading. At suitable intervals, bolts 39 may be passed through the member to hold the parts together.

At each end thereof a cross member is provided with a latching head. Each end of a cross member is provided with a socket 40, preferably metal lined as indicated at 41. In one portion of the lining 41, a tongue 42 is struck downwardly at an angle, and this tongue is provided with an aperture 43 therein. The cross member itself is provided with an aperture 44 directly opposite the tongue 42 to permit the insertion of a tool for manipulating the tongue. The latching head includes a shank 45 preferably of I or H beam contour which is slidable inside the socket 40. At the rear end thereof this shank is provided with an upstanding lug 46 disposed behind the aforesaid tongue 42, the tongue preventing the withdrawal of the head from the socket, unless it is pulled upwardly to clear the lug 46 by means of a tool inserted through the aperture 44. On the protruding end of the shank is a latching head 47 having a pair of depending pins 48—48 of a size to engage through the aforesaid apertures 23 in the angle irons 21 and 22 and the apertures 26 in the collars 24 on the columns. It will be especially noted from the showing in Fig. 7 that the pins 48—48 are not centrally disposed on the head 47, but one pin is nearer the adjacent side of the head than is the other. This latching head construction is essentially the same in construction and operation as that shown in United States Patent No. 2,497,683 to Nampa, Tobin, and Dunlap at 72 thereof.

Inside the head is a cavity 49, and in the cavity is a pivotal lever or member 50 having on its lower end a latching dog 51, and on its upper end a thumb lever 52. Between the body of the lever and the rear of the socket 49 is an inverted U-shaped spring element 53 which constantly urges the lever outwardly into the position seen in Figure 6. Lateral displacement of the member 50 is prevented by a keying pin 75 projecting into a slot 77 in the member 50. With reference to Figures 3 and 6, it is apparent that the latch dog 51 may readily be retracted by elevating the thumb lever 52, the head 47 disposed over an angle iron or the flange on a collar 24, the pins 48 dropped through holes, the thumb lever 52 released, and the latch dog 51 will engage underneath the outer edge of the collar or angle iron flange, thus firmly locking the cross member 4 to a respective flange.

In order to connect a cross member to a cross member, one cross member may be provided with a slidable sleeve 54 (Fig. 5), which sleeve has oppositely extending flanges 55—55 each of which is provided with a series of apertures 56, of the same character as the angle iron flanges and collar flanges above described. The sleeve may be temporarily anchored at any desired position along a cross member 4 by one or more nails 57 driven through suitable apertures in the sleeve into the wooden portion of a cross member, or in an equivalent manner. In this way, sleeves or adapters 54 may be disposed wherever desired along cross members in order to provide a particular hookup in keeping with the character of the lading.

In using the instant invention, the hold of the ship is first squared as illustrated in Fig. 2, and then, depending upon the nature of the cargo or lading, columns 1 are disposed at desired locations and mounted as above described. Cross members 4 are then connected with these columns in order to define desirably sized cargo areas. Adapters 5 may be used wherever desired in order to connect one cross member to another, if the same is deemed necessary. In case a particular portion of the cargo is heavy or of a peculiar shape, cross members may be used in juxtaposition to each other so that a number of the cross members may contact the same cargo pieces.

It will be especially noted that extremely fine adjustments are possible with this invention. For example, if the holes on the vertically disposed angle irons 21 and 22, the holes in the collar flanges, and the holes in the adaptors, are one inch apart, half inch adjustments of the cross members are possible. For example, looking at Fig. 4, it will be seen that the upper diagrammatically indicated cross member head 47 is disposed so that one pin will enter the right hand hole of the adjacent flange, while the other pin 48 will enter the second hole from the left, one hole being disposed between the pins. Should this member be moved to the left, so that the first and third holes are occupied by the pins, a one inch adjustment to the left has been provided. However, by virtue of the fact that the pins 48—48 are not evenly disposed relatively to the head 47, by inverting the cross member and mounting it upside down, a half inch adjustment may be obtained. The cross members may be connected to the respective apertured flanges in any desired position, right side up, upside down, and in connection with the vertical flanges, sidewise as indicated in Figs. 3 and 4. Thus, it is possible to obtain whatever adjustment may be necessary for any kind of lading.

The cross members and columns are readily removable when the cargo is unloaded. When not in use, it is a simple expedient to stow the cross members and columns in the region 11 defined by the squaring of the hold. The rectangular apertures 16—16 in the lower deck 2 at each socket 8 may have suitable plugs dropped therein so that the deck will have a flush upper surface.

It should also be noted that utilizing cross members 4 one upon the other, temporary bulkheads may be established wherever and whenever desired.

From the foregoing, it is apparent that I have provided cargo loading and storage apparatus of a highly flexible character, substantially all of which may be removed and stowed when not in use, which is readily and easily handled, and which is economical to both make and use.

It will be understood that modifications and variations may be effected without departing from the scope of the novel concepts of the present invention.

I claim as my invention:

1. Cargo storage apparatus including means providing vertically spaced substantially horizontal surfaces, portable uprights, means on said means providing said surfaces and on said uprights to detachably hold said uprights in vertical position, vertical attachment flanges and horizontal attachment flanges both fixed on said uprights, and portable cross-members releasably engaged with said attachment flanges.

2. Cargo storage apparatus including means providing vertically spaced substantially horizontal surfaces, portable uprights, means on said means providing said surfaces and on said uprights to detachably hold said uprights in vertical position, vertical attachment flanges and horizontal attachment flanges both fixed on said uprights, each of said flanges having a series of openings therein, and cross-members releasably connected with said flanges at desired points therealong and also carrying flanges for interconnection between cross members.

3. Cargo storage apparatus including means providing vertically spaced substantially horizontal surfaces, portable uprights, means on said means providing said surfaces and on said uprights to detachably hold said uprights in vertical position, cross-members, holding means carried at the ends of said cross-members for selective engagement with said uprights and further cross-members, and adapter means movable along a cross-member and mountable in an intermediate location on a cross-member for engagement by said holding means on other cross members.

4. Cargo storage apparatus including means providing vertically spaced substantially horizontal surfaces, portable uprights, means on said means providing said surfaces and on said uprights to detachably hold said uprights in vertical position, attachment flanges on said uprights, cross-members detachably connected to said flanges, and sleeve members carrying oppositely disposed attachment flanges thereon, said sleeve members being slidable along a cross-member to a desired location at which point further cross-members may be attached to said sleeve.

5. Cargo storage apparatus including means providing vertically spaced substantially horizontal surfaces, portable uprights, means on said means providing said surfaces and on said uprights to detachably hold said uprights in vertical position, attachment flanges on said uprights, cross members detachably connected to said flanges, adapter members carrying similar attachment flanges slidable along a cross-member, and means engaging said cross-member to anchor an adapter member at a desired location on said cross-member in position for attachment of further cross-members thereto.

6. Cargo storage apparatus including means providing vertically spaced substantially horizontal surfaces, columns, laterally flanged collars circumscribing and mounted on and in fixed relation to said columns at selected intervals therealong, angles having outstanding flanges secured to and extending lengthwise of said columns between adjacent collars, and cross-members carrying means detachably connected to the flanges of said collars and said angles.

7. Cargo storage apparatus including means providing vertically spaced substantially horizontal surfaces, portable uprights, means on said means providing said surfaces and on said uprights to detachably hold said uprights in vertical position, attachment means mounted in fixed relation on and projecting from each said upright both at right angles to and paralleling the axis of the upright, and cross-members detachably connected to said attachment means at desired points.

8. Cargo storage apparatus for lading between upper and lower decks, including lower deck sockets, upper deck depending sockets, portable columns each seated in a pair of said opposed sockets, slidably mounted removable locking plugs interengaged with said columns to hold each column in a said socket, and cross-members detachably connected to said columns for interconnecting them.

9. Cargo storage apparatus for lading between upper and lower decks, including lower deck sockets attached to the underside of a lower deck, said lower deck having a pair of adjacent apertures above each socket, portable columns each seated on the deck over one of said sockets, locking plugs slidably interengaged with each of said columns and insertable through said apertures in each said socket to hold the column against lateral shifting, and means associated with the upper deck to hold the upper ends of said columns.

10. Cargo storage apparatus for lading between upper and lower decks, including lower deck sockets attached to the underside of a lower deck, said lower deck having a pair of adjacent apertures above each socket, portable columns each seated on the deck over one of said sockets, locking plugs carried by said columns insertable through said apertures in each said socket and engaging the sockets to hold the columns against lateral shifting, a tubular socket depending from the upper deck above each said lower deck socket, and said columns being longer than the distance between the lower deck and the lower ends of the depending sockets but shorter than the distance between decks.

11. Cargo loading apparatus for lading between upper and lower decks, including hollow column holding means depending from the upper deck, column holding means connected to the lower deck and comprising a recess in said lower deck, portable columns each shorter than the distance between decks and mountable in opposed pairs of holding means, means engaged with said columns for extending the effective length of said columns to contact said opposed pairs of holding means whereby said columns are retained in fixed position by said holding means, and cross-members connectable to said columns at desired locations therealong.

12. Cargo storage apparatus including means providing vertically spaced substantially horizontal surfaces, portable columns, means on said means providing said surfaces and on said uprights to detachably hold said columns upright, attaching flanges projecting laterally from and longitudinally along said columns, each flange having a series of apertures therealong, cross-members, connecting heads on said cross-members, a pair of spaced pins on each said head offset from the center thereof to enter a pair of apertures in said flanges with one aperture between the pins, and said heads being detachably connected to said flanges from either side of the flange whereby minute vertical or horizontal adjustments are possible in the placement of cross-members.

13. Cargo storage apparatus for lading between upper and lower decks, including lower deck sockets attached to the underside of the lower deck, said lower deck having a pair of adjacent apertures above each of said sockets, portable columns each seated on the deck over one of said sockets, locking plugs operatively engaged with each said column and insertable through said apertures in each said socket to hold the column against lateral shifting, a tubular socket depending from the upper deck above each said lower deck socket, said columns being longer than the distance between the lower deck and the lower ends of the depending sockets but shorter than the distance between decks, and means associated with said columns and said plugs for releasably maintaining said plugs in said sockets and said columns in vertical position.

14. In a cargo bracing apparatus, means providing upper and lower surfaces, upright columns, means for respectively connecting opposite ends of said columns to said means providing said upper and lower surfaces and including a sliding joint between each of said columns and the means providing at least one of said surfaces whereby variations in the spacing between said surfaces do not load said columns, attachment means on said columns between the ends thereof, cross bars extending transversely to said columns and having attachment heads for connection to said attachment means, said cross bars including bodies adapted to engage cargo and said heads being freely telescopic in said bodies to accommodate variations in the spacing of said columns.

15. In a cargo bracing apparatus, means providing opposing surfaces that may be subjected to deflection toward or away from each other, primary support members arranged to extend transversely to said surfaces, means connecting the ends of said members to said means providing said surfaces and including connecting means providing for relative movement between at least one of said surfaces and said members in a direction along the lengths of the members, secondary support members adapted to extend transversely of said primary support members, and means connecting the ends of said secondary members to said primary members and including means providing for relative movement between said respective members in a direction along the lengths of said secondary members.

16. In a cargo bracing apparatus, upright columns, cross bar attachment means on said columns, cross bars supported on said columns and having body portions adapted to engage cargo and attachment elements at opposite ends of said body portions, attachment means for at least certain of said cross bars whereby cross bars may be connected between cross bars, said elements being capable of connection to each said cross bar attachment means, said elements being offset from the center lines of said body portions.

17. In a cargo bracing apparatus, primary support members, secondary support members, attachment means for both said primary and secondary support members whereby said primary and secondary support members may be interconnected, said attachment means having a predetermined pitch, said secondary members having body portions adapted to engage cargo, elements for connecting said secondary members to said attachment means, said elements being offset from the center lines of said body portions whereby faces of said bodies may be located at various positions spaced from each other by increments less than said pitch.

References Cited in the file of this patent

UNITED STATES PATENTS

| | | |
|---|---|---|
| 1,611,419 | Copony | Dec. 21, 1926 |
| 1,868,638 | Mackey | July 26, 1932 |
| 2,497,683 | Nampa et al. | Feb. 14, 1950 |
| 2,514,229 | Fahland | July 4, 1950 |
| 2,519,846 | Nampa | Aug. 22, 1950 |
| 2,546,929 | Nampa | Mar. 27, 1951 |
| 2,679,214 | Nampa | May 25, 1954 |